United States Patent
Yano et al.

(10) Patent No.: US 6,275,657 B1
(45) Date of Patent: *Aug. 14, 2001

(54) DUAL IMAGE COINCIDENCE TYPE FINDER SYSTEM

(75) Inventors: Takaaki Yano; Sachio Hasushita; Tetsuya Abe, all of Hokkaido (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,776

(22) Filed: Dec. 29, 1997

(30) Foreign Application Priority Data

Dec. 27, 1996 (JP) ........................................ 8-357488
Dec. 27, 1996 (JP) ........................................ 8-357489

(51) Int. Cl.$^7$ .................................................. G03B 13/18
(52) U.S. Cl. .............................. 396/84; 396/148; 396/147
(58) Field of Search .................................. 396/141, 142, 396/143, 140, 139, 147, 148, 152, 84, 88, 79, 80, 81, 82, 83, 94, 379, 137; 352/140

(56) References Cited

U.S. PATENT DOCUMENTS

| 3,108,526 | * | 10/1963 | Brackett | 396/152 X |
| 3,260,184 | * | 7/1966 | Pagel et al. | 396/379 X |
| 3,367,254 | | 2/1968 | Townsley | 396/117 |
| 3,529,528 | | 9/1970 | Leitz | 396/117 |
| 3,643,574 | * | 2/1972 | Moriyama et al. | 352/140 |
| 4,134,656 | * | 1/1979 | Yoshino | 396/141 |
| 4,303,323 | * | 12/1981 | Imai et al. | 396/141 |

OTHER PUBLICATIONS

Shiramatsu, Tadashi, "The Impact brought By The Leica M3 (IV) Bright–Frame Viewfinder No. 2," *Photographic Industries*, pp. 83–88 (Mar. 1996), along with an English language translation.

* cited by examiner

Primary Examiner—W. B. Perkey
(74) Attorney, Agent, or Firm—Greenblum & Bernstein, P.L.C.

(57) ABSTRACT

Disclosed is a dual image coincidence type finder system for a camera. Within a finder field, a dual image composed of superimposed two images is formed. A light deflecting system is provided to change degree of relative displacement between the superimposed two images. The light deflecting system is controlled to change the degree of relative displacement between the superimposed two images in accordance with an object distance.

18 Claims, 5 Drawing Sheets

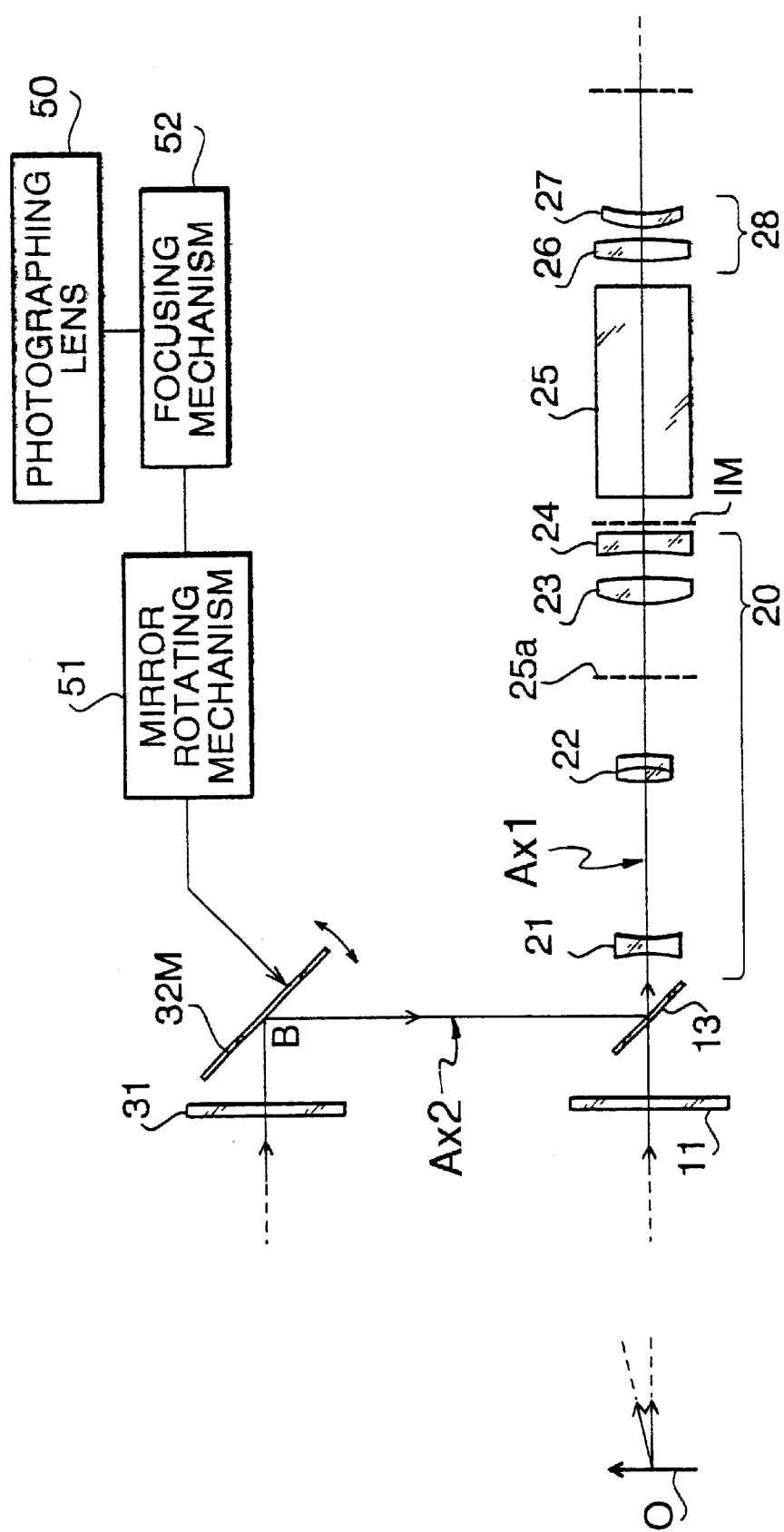

DUAL IMAGE COINCIDENCE TYPE FINDER SYSTEM

BACKGROUND OF THE INVENTION

The present invention relates to a finder system for a camera, and particularly to a finder system which is provided separate from a taking (photographing) optical system.

Recently, an autofocusing function is generally employed in cameras, not only SLR (single lens reflex cameras) but also so-called compact cameras. In SLRs, degree of blur on a focusing plate changes in accordance with a focusing condition of a photographing lens, an operator can confirm whether an intended object is focused or not through a finder.

In cameras which have a finder system separately from the photographing optical system, however, the operator may know whether an object is focused from an indicator such as a small lamp inside the finder. That is, when the lamp is ON, the photographing lens is focused on the object. In this type of cameras, the operator only knows whether the photographing lens is focused on an object or not, and the operator cannot confirm whether the intended object is correctly focuses or not in advance when the exposure is performed. That is, if the autofocusing is executed with the intended object being out of a focusing zone (which is, for example, at a central part of a finder field), or it is difficult to execute auto-focusing (e.g., the object is a flame, or the object is a scenery through a window glass), the intended object may not be focused even though the indicator indicates the in-focus condition.

SUMMARY OF THE INVENTION

It is therefore an object of the invention is to provide a finder system which enables an operator to confirm, in advance, whether an intended object will be photographed in in-focus state.

Another object of the invention is to provide a dual image coincidence type finder system in which the size of the optical path composing element such as the half mirror can be made relatively small, with suppressing the manufacturing cost.

For the above object, according to the invention, there is provided a dual image coincidence type finder system for a camera, said finder system having a first window and a second window through which light from an object being entered, said first window and said second window being apart from each other by a predetermined base length, comprising: a image combining system which generates a superimposed image by superimposing a first image corresponding to said first window and a second image corresponding to said second window; a distance-related information input system which obtains information corresponding to a distance to said object; and a controller which controls said image combining system to vary relative position of said first image and said second image in accordance with said information corresponding to said distance to said object.

According to another aspect of the invention, there is provided a dual image coincidence type finder system for a camera, said finder system having a first window and a second window through which light from an object being entered, said first window and said second window being apart from each other by a predetermined base length, comprising: an eyepiece optical system used for observing an object image within a finder field; a deflecting system which deflects light entered from said second window, a beam combining element, which combines light entered from said first window, and light entered through said second window and deflected by said deflecting system, said object image observed within said finder field including a dual image area showing superimposed two images respectively corresponding to light entered through said first window and said second window, said deflecting system changing degree of relative displacement between said superimposed two images; a distance-related information input system which obtains information corresponding to a distance to said object; and a controller which controls said deflecting system, in accordance with said information corresponding to said distance to said object, to change a deflecting condition so that said superimposed two images coincide.

Thus, the operator of the camera can confirm whether the object is currently focused on or not by observing the object through the finder system.

According to furthermore-aspect of the invention, there is provided a dual image coincidence type finder system for a camera, said finder system having a first window and a second window through which light from an object being entered, said first window and said second window being apart from each other by a predetermined base length, comprising: a deflecting system which deflects light entered from said second window; a beam combining element, which combines light entered from said first window, and light entered through said second window and deflected by said deflecting system; a real image type objective optical system, light combined by said beam combining element entering said objective optical system, a real image of said object being formed by said objective optical system on an image plane; and an eyepiece optical system used for observing said real image formed by said objective optical system, wherein said real image includes a dual image composed of superimposed two images respectively corresponding to light entered through said first window and said second window, and wherein said deflecting system is capable of changing degree of relative displacement between said superimposed two images.

Since the objective lens is provided on the eyepiece optical system side with respect to the beam combining element, only a single objective optical system is required. Accordingly, the number of elements of the finder system is reduced, and further, the structure thereof is made simple.

Optionally, the finder system may be further provided with a distance-related information input system which obtains information corresponding to a distance to said object, and a controller which controls said deflecting system, in accordance with said information corresponding to said distance to said object, to change a deflecting condition so that said superimposed two images coincide with each other.

Since the status of the dual image is changed in accordance with the object distance, the operator can recognize the object currently focused.

Optionally, said distance-related information input system may be a distance measuring device which independently detects said distance to said object.

Further, said deflecting system may include a rotatable mirror rotatable about an axis which is perpendicular to said base length direction.

In this case, it may be advantageous that said deflecting system includes a driving mechanism which drives said rotatable mirror. The driving mechanism may be a mechanism which drives the rotatable mirror in response to movement of focusing lens of the camera.

Still optionally, the finder system may include a dual image area defining system which defines an area of said dual image within a finder field. By restricting the area of the dual image within the finder field, it is easy to recognize whether the two image of the dual image area coincide.

The dual image area defining system may have an aperture plate located between said second window and said beam combining element. Alternatively, said dual image area defining system comprises a mirror surface between said second window and said beam combining element, said mirror surface reflects a predetermined part of light entered through said second window corresponding to an area of said dual image.

Still alternatively, said deflecting system comprises a rotatable mirror rotatable about an axis which is perpendicular to said base length direction, and said dual image area defining system may have a reflection surface of said rotatable mirror, said reflection surface reflects a predetermined part, corresponding to an area of said dual image, of light entered through said second window.

Further optionally, the beam combining element may include a transparent plate having a half mirror portion, light entered through said finder window passing through said transparent plate, and light deflected by said deflecting system being incident on said half mirror portion.

Furthermore, said objective optical system may be a variable-magnification optical system. Since there is a single optical system, varying the magnification of the finder system can be done relatively easily.

In this case, said objective optical system may have a plurality of lens groups, magnification of said objective optical system being changeable by changing positional relationship said plurality of lens groups.

BRIEF DESCRIPTION OF THE DRAWINGS

FIG. 1A is a schematic block diagram showing a modified structure of the finder system shown in FIG. 1;

DETAILED DESCRIPTION OF THE PREFERRED EMBODIMENTS

Hereinafter, embodiments of the invention will be described with reference to the accompanying drawings.

Figure 1:
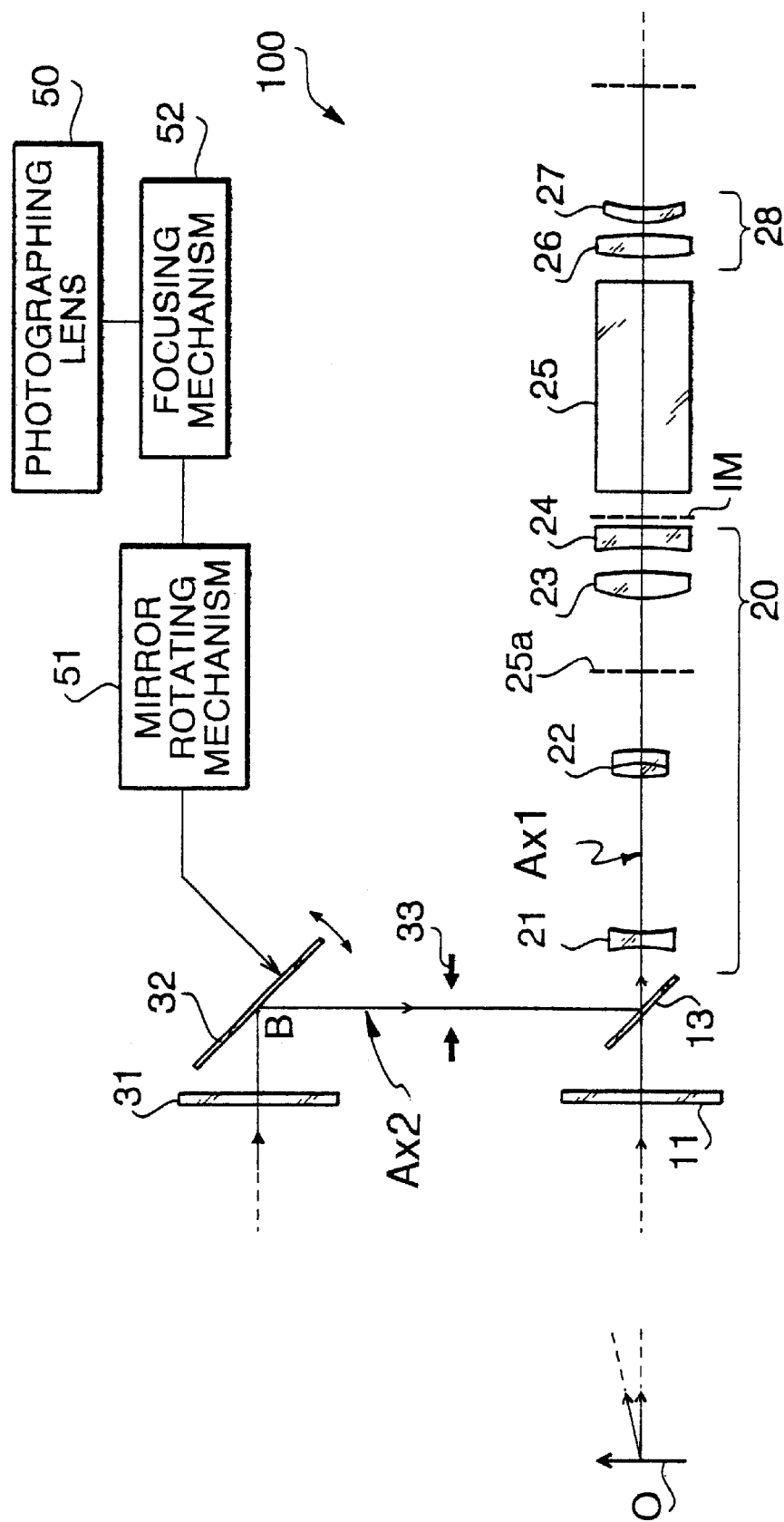
FIG. 1 is a schematic block diagram showing a structure of a dual image coincidence type finder optical system according to a first embodiment of the invention.

FIG. 1 is a diagram showing an arrangement of optical elements of a dual image coincidence type finder system 100 according to a first embodiment of the invention. It should be noted that the finder system 100 is to be employed in a camera separately from a photographing optical system. In the embodiments, degree of coincidence of two images which are superimposed to form the dual image is varied in accordance with movement of the photographing lens, or result of distance measurement so that an operator is capable of confirm, in advance, whether an object will be photographed in in-focus state.

Conventionally, as a finder system provided in a camera separately from the photographing lens system, the dual image coincidence type finder, or a range finder system has been known. The dual image coincidence type finder (i.e., the range finder system) is provided with a first window and a second window which are apart by a predetermined distance in a base line direction which is perpendicular to the optical axis of the camera. Flux of light entered through the first window and the second window is combined by means of a beam combiner such as a half mirror or the like, and is directed towards an eyepiece optical system. An operator of the camera observes the composed dual image (i.e., a pair of superimposed images). Between the first window and the half mirror, a rotatable mirror is provided. The rotatable mirror deflects the incident flux of light such that degree of coincidence of the superimposed two images along the base line is changed. A rotation angle of the half mirror when the two images coincide with each other corresponds to a distance of an object from the camera.

Two types of conventional dual image coincidence type finder systems have been known. In a first type finder system, two objective lenses are provided in two optical paths, respectively, on the object side of the half mirror. In a second type finder system, a virtual image type objective lens is provided on the eyepiece lens side of the half mirror.

In the first type finder system, especially when the objective lens system uses a real image type optical system, edges of two images can be observed clearly, and the field of view is also observable clearly. However, the first type system requires a relatively large number of elements, and accordingly, a manufacturing cost may be relatively high. Further, if the photographing lens of the camera is a zoom lens, and it is necessary to change the magnification of the finder optical system in accordance with the change of the magnification of the zoom lens, the two objective lens for the first window and the second window should be moved simultaneously and synchronously with the movement of the zoom lens. Therefore, a complicated structure is required.

The second type finder system requires less number of elements in comparison with the first type system, and is relatively easy to be assembled. Therefore, manufacturing cost of the second type finder system can be relatively low. However, in the second type finder system, since the half mirror is arranged on the object side of the virtual image type objective lens, the area of the half mirror should be made relatively large. Further, due to characteristic of the virtual image type objective lens, a field frame in the viewing field of the finder may not be observed clearly. Therefore, in the second type finder system, it is difficult to display various information in the finder view.

It is preferable that the size of the optical path composing element such as the half mirror can be made relatively small, and further the manufacturing cost is suppressed. In the following embodiments, the dual image coincidence type finder systems satisfying the above condition will be described.

In FIG. 1, the finder optical system 100 is a range finder system and includes a first window 11 and a second window 31 which are apart from each other by a predetermined amount along a base length direction. Light directed from an object and is entered through the first window 11 and light entered through the second window 31 are combined by a beam combining element 13, and directed towards the objective lens 20 consisting of four groups of lenses 21, 22, 23 and 24. In this embodiment, the objective optical system is a real image type image forming optical system having a positive power, and accordingly the objective optical system 20 forms a real image of the object on an image plane IM.

Specifically, the light emitted from the objective optical system 20 passes through a mirror 25a and a prism 25 which constitute an erecting optical system. The light further proceeds and enters an eye of an operator through an eyepiece optical system 28 which consists of two lens groups 26 and 27. The prism 25 is a rectangular prism having three reflection surfaces which are perpendicular to each other. In FIG. 1, for simplifying the drawing, the prism 25 is shown as developed.

It should be noted that in the following description, a first optical axis Ax1 is defined as an axis linearly extending the optical axis of the objective optical system 20 and the eyepiece optical system 28, and a second optical axis Ax2 is defined as a bent first axis Ax1 bent by the beam combining element 13, at a right angle, towards the rotatable mirror 32.

Figure 2:
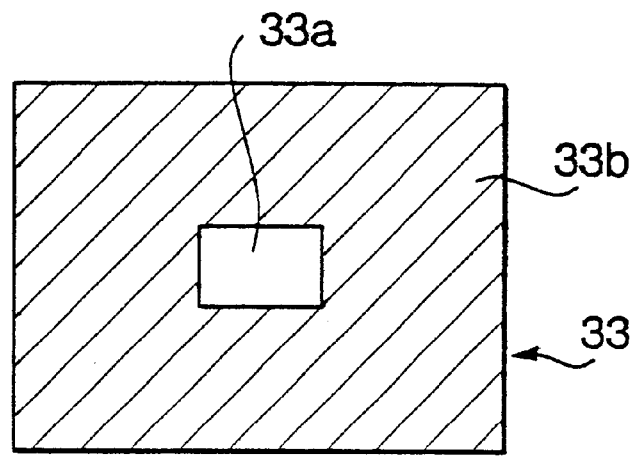
FIG. 2 shows a front view of an aperture plate used in the finder optical system shown in FIG. 1.

Between the rotatable mirror 32 and the beam combining element 13, an aperture plate 33 is inserted in the optical path in order for defining an area of a dual image by regulating the area of the light proceeding from the second window 31 towards the beam combining element 13. As shown in FIG. 2, the aperture plate 33 is a rectangular plate having a transparent rectangular area 33a and an opaque area 33b surrounding the transparent area 33a.

The beam combining element 13 is a transparent parallel plate formed with a half mirror portion at the central part thereof. The beam combining element 13 is arranged such that the surface thereof inclines at 45 degrees with respect to the first optical axis Ax1. Accordingly, the first optical axis Ax1 and the second optical axis Ax2 form a right angle.

At a peripheral portion of the field of view which is to be observed through the eyepiece optical system 28, only the light entered from the first window 11 is incident on the objective optical system 20, and at a central portion of the field of view, the light entered from both the first window 11 and the second window 31 is combined and incident on the objective optical system 20. Accordingly, when the operator views the finder field through the eyepiece optical system 28, a single image which is formed with the light entered from the first window 11 is observed at the peripheral area, and the dual image, i.e., superimposed two images respectively formed with the light entered from both first and second windows 11 and 31, is observed at the central area.

The rotatable mirror 32 is rotatable, in directions indicated by arrow in the drawing, about a rotation axis B which is perpendicular to the second optical axis Ax2. By rotating the rotatable mirror 32 to vary the deflection direction of the light, which is entered through the second window 31 and reflected by the rotatable mirror 32, the degree of coincidence of the dual image, observed through the eyepiece optical system 28, at the central area of the finder field can be changed in the base length direction.

In the first embodiment, a mirror rotating mechanism 51 for rotating the rotatable mirror 32 is provided. The mirror rotating mechanism 51 is coupled with a focusing mechanism 52 of a photographing lens 50. That is, when the photographing lens 50 focuses on an object, the rotating mirror 32 rotates and the two images forming the dual image of the object coincide.

Figure 3:
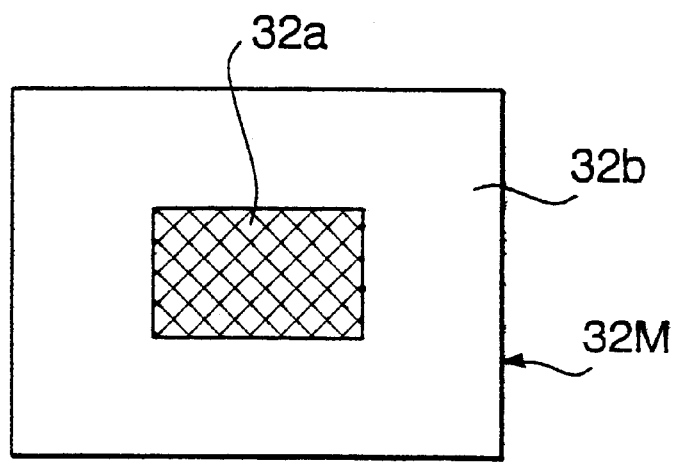
FIG. 3 shows a front view of a modified rotatable mirror used in the finder optical system shown in FIG. 1.

It should be noted that the aperture plate 33 can be placed at any position between the second window 31 and the beam combining element 13 as far as the aperture plate 33 does not interfere movement of the rotatable mirror 32. Alternatively, it may be possible to make the rotatable mirror 32 to have a function of the aperture plate 33; In this case, the aperture plate 33 is omitted, and further, as shown in FIGS. 1A and 3, the rotatable mirror 32M is configured to have a rectangular reflection area 32a, and non-reflection area 32b surrounding the reflection area 32a. It should be noted that, except the above, the system shown in FIG. 1A is the same as the system shown in FIG. 1. Further alternatively, in the system shown in FIG. 1A, the rotatable mirror 32M may be modified to have only the size of the reflection area 32a in FIG. 3.

If it is necessary to show a field frame in the finder field, by providing the frame at a position closely adjacent to the image plane IM, the frame can be observed clearly through the eyepiece optical system 28. If various information such as a shutter speed and the like is to be displayed by means of an LCD (liquid crystal display) or the like, similarly to the above, by providing the displaying element at the position closely adjacent to the image plane IM, the displayed image may be observable clearly.

Figure 4:
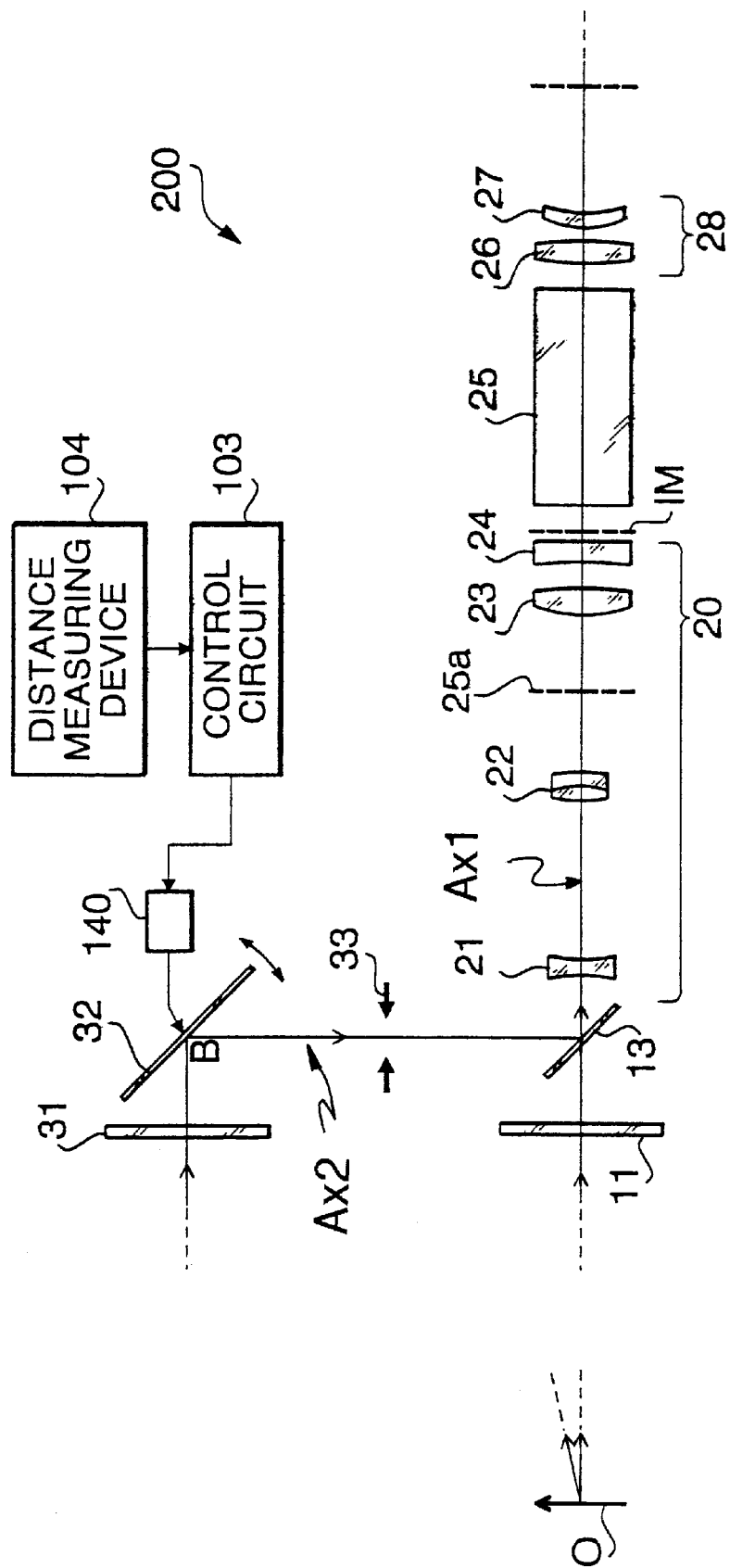
FIG. 4 is a schematic block diagram showing a structure of a dual image coincidence type finder optical system according to a second embodiment of the invention.

FIG. 4 is a diagram showing another dual image coincidence type finder system 200 according to a second embodiment of the invention. The second embodiment is similar to the first embodiment except that the second embodiment is provided with a distance measuring device 104, a control circuit 103, and a motor 140 for driving the rotatable mirror 32 to rotate.

The distance measuring device 104 detects a distance to the object, or a distance-related information, and outputs the same. Then, the control circuit 103 drives the motor 140 in accordance with the distance-related information output by the distance measuring device 104 so that the two images included in the dual image formed by the light entered from the first window 11 and the second window 31 coincide with each other.

The distance-related information is, generally, used in an autofocusing device for driving a photographing lens to an in-focus position. In the embodiment described above, the distance-related information is also used for determining the rotation angle of the rotatable mirror 32. With this function, the operator is capable of confirming whether a desired object is focused or not, through the finder. That is, if the object whose distance is measured is the object the operator intends to photograph, the two images forming the dual image coincide, and accordingly it is confirmed that the desired object will be photographed. If the two images forming the dual image of the desired object do not coincide, the similar operation is to be repeated until the two images, which are superimposed to form the dual image, of the desired object coincide with each other. Coincidence of the two images means that the photographing lens is positioned at the in-focus position with respect to the desired object.

In the second embodiment, the distance measuring device 104 for directly measuring object distance is used for inputting distance-related information to the control circuit 103. It may be possible to use a position information of the focusing lens to determine the rotation angle of the rotatable mirror 32 since the position of the focusing lens corresponds to the object distance. Alternatively, a defocus amount can also be used if the distance measuring device is a device employing a phase difference method. When the defocus amount is utilized for determining the rotation position of the rotatable mirror 32, the position of the photographing lens should also be referred to. Then, based on the defocus amount and current lens position, the rotation position of the rotatable mirror can be determined.

If the photographing lens is a zoom lens, it is preferable that magnification of the finder system is changeable in accordance with change of magnification of the zoom lens. FIGS. 5A, 5B, 6A and 6B are diagrams showing arrangement of the lenses when the magnification of the finder system is changed. The structure of the optical system shown in FIGS. 5A through 6B is the same as that of the first and second embodiments. By moving the second lens group 22 of the objective optical system 20 in the direction of the optical axis, the magnification is changed.

Figure 5A:
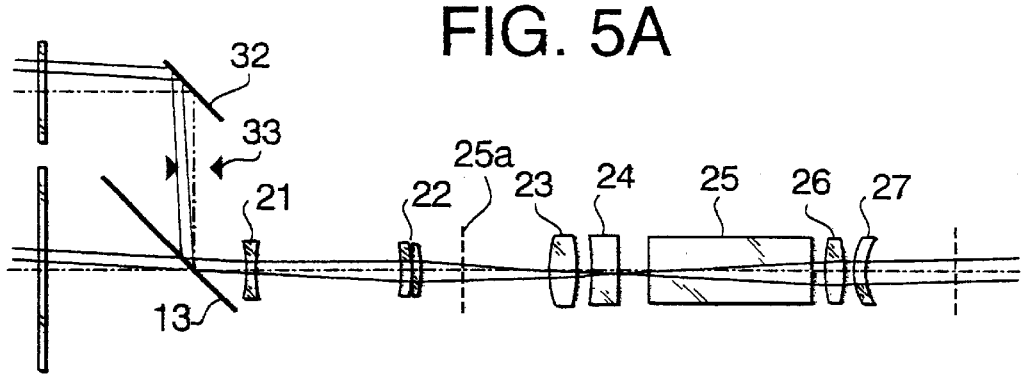
Figs. 5A and 5B are diagrams showing optical paths when the finder optical system is constructed to have a magnification changeable optical system and the magnification is relatively low.
Figure 5B:
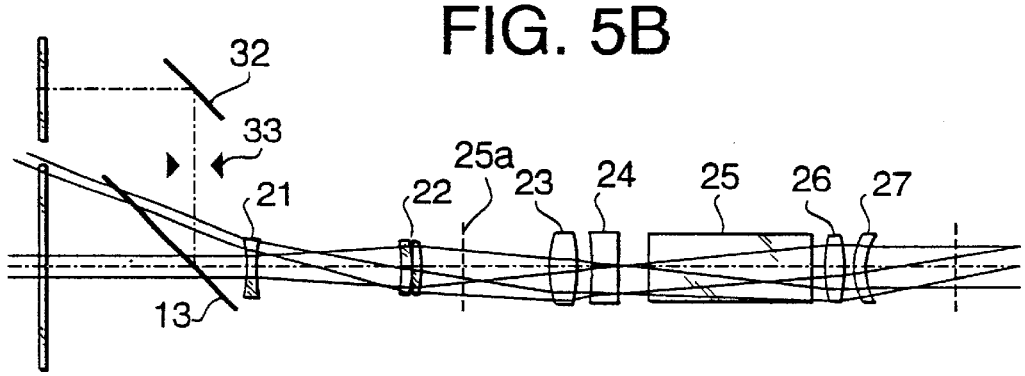

FIGS. 5A and 5B show the arrangement of lens groups when the magnification is relatively low. FIG. 5A shows the optical path of light entered from the second window 31 and proceeds towards the eye of the operator. FIG. 5B shows the optical path of the light entered from the first window 11 and proceeds towards the eye.

In FIG. 5A, two parallel lines representing two rays of light entered through the second window 31 define a range in which light from a certain point to be observed in the dual image area in the finder field is included. Another two parallel rays of light entered through the first window 11 indicate a range including light from the same point as above.

In FIG. 5B, a pair of two parallel rays of light respectively represent ranges of light from two different points which can be observed in the finder field.

Figure 6A:
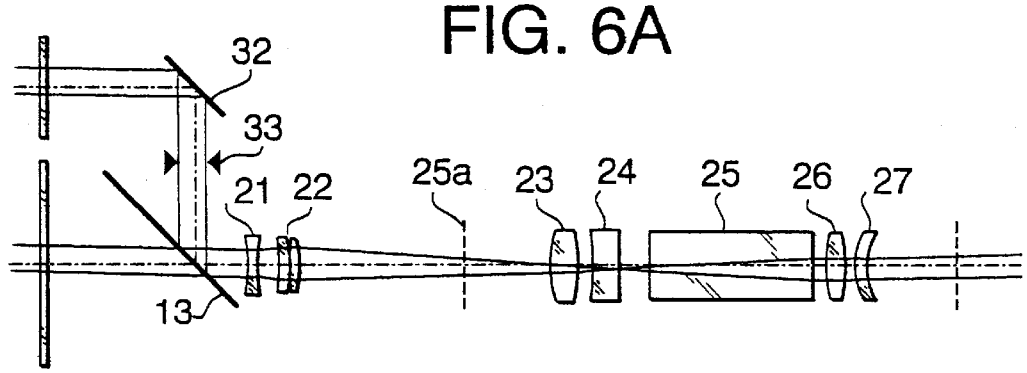
FIGS. 6A and 6B are diagrams showing optical paths when the finder optical system is constructed to have a magnification changeable optical system and the magnification is relatively high.
Figure 6B:
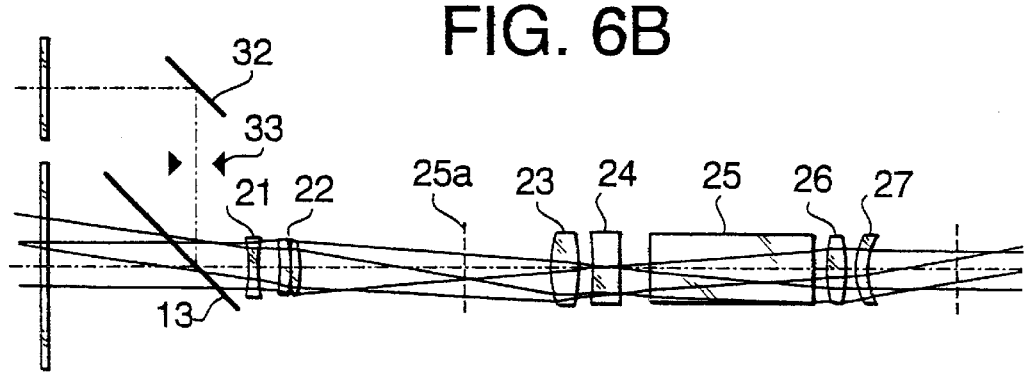

FIGS. 6A and 6B are similar to FIGS. 5A and 5B except that, FIGS. 6A and 6B show a condition where the magnification is relatively high.

As described above, since the real image type objective lens, which is commonly used for receiving light entered through the first and second windows, is provided on the image side of the beam combining element 13, only by moving a lens group located on the image side of the second window and the first window, the magnification of the image observed through the eyepiece optical system can be changed. Accordingly, in comparison to the conventional system in which a pair of lenses provided for the second window and the first window, respectively, are moved, the number of lenses and the lens driving mechanism can be simplified.

As described above, according to the embodiments, the size of the optical path composing element can be made small since the real image objective optical system is provided on the eyepiece optical system side of the beam combining element. Further, according to the construction described above, the field frame in the finder field can be observed clearly, and therefore, it is easy to display various information in the finder. Furthermore, since only a single objective optical system is employed, the number of elements can be reduced in comparison to the conventional finder system. Still further, if the magnification of the finder system is to be changed, only by moving a lens group on which both the light entered from the first window and the second window is incident, the magnification of the image can be changed. Accordingly, the mechanism for driving the lens for changing the magnification can be simplified in comparison to the conventional finder system.

Yet further, according to the embodiments, if the finder system according to the invention is employed in a camera, the dual image (i.e., the superimposed images) can be used for confirming the focusing condition. It should be noted that, in view of confirmation of the focusing condition, the dual image coincidence finder system is not limited to the ones described as embodiments but any coincidence type finder system such as a virtual image type finder system, and a system whose base length direction is different from the base length direction of the above-described embodiments can be used.

The present disclosure relates to subject matters contained in Japanese Patent Applications No. HEI 08-357488 and No. HEI 08-357489, filed on Dec. 27, 1996, which are expressly incorporated herein by reference in their entireties.

What is claimed is:

1. A dual image coincidence type finder system for a camera, said finder system having a first window and a second window through which light from an object enters, said first window and said second window being spaced from each other by a predetermined base length, said finder system comprising:

a image combining system which generates a superimposed image by superimposing a first image corresponding to said first window and a second image corresponding to said second window;

a distance-related information input system which obtains information corresponding to a distance to said object, said distance-related information input system comprising a distance measuring device which independently detects said distance to said object; and a controller which controls said image combining system to vary a relative position of said first image and said second image in accordance with said information corresponding to said distance to said object.

2. A dual image coincidence type finder system for a camera, said finder system having a first window and a second window through which light from an object enters, said first window and said second window being spaced from each other by a predetermined base length, said finder system comprising:

an eyepiece optical system for observing an object image within a finder field;

a deflecting system which deflects light entering through said second window;

a beam combining element, which combines light entering through said first window, and light entering through said second window and deflected by said deflecting system, said object image observed within said finder field including a dual image area showing two superimposed images respectively corresponding to light entering through said first window and through said second window, said deflecting system changing a degree of relative displacement between said two superimposed images;

a distance-related information input system which obtains information corresponding to a distance to said object, said distance-related information input system comprising a distance measuring device which independently detects said distance to said object; and a controller which controls said deflecting system, in accordance with said information corresponding to said distance to said object, to change a deflecting condition so that said two superimposed images coincide.

3. The finder system according to claim 2, further comprises a single objective optical system on the eyepiece optical system side of said beam combining element.

4. The finder system according to claim 3, wherein said objective optical system comprises a real image type image forming optical system having a positive power, and wherein said finder system further comprises an erecting optical system between said objective optical system and said eyepiece optical system.

5. The finder system according to claim 2, wherein said deflecting system comprises a rotatable mirror rotatable about an axis which is perpendicular to said base length direction.

6. The finder system according to claim 5, wherein said controller calculates a rotation amount of said rotatable mirror based on said information related to said distance to said object, and drives said rotatable mirror to rotate.

7. The finder system according to claim 2, wherein said beam combining element comprises a transparent plate having a half mirror portion, light entering through said finder window passing through said transparent plates and light deflected by said deflecting system being incident on said half mirror portion.

8. A dual image coincidence type finder system for a camera, said finder system having a first window and a second window through which light from an object enters, said first window and said second window being spaced from each other by a predetermined base length, said finder system comprising:

a deflecting system which deflects light entering through said second window;

a beam combining element, which combines light entering through said first window, and light entering through said second window and deflected by said deflecting system;

a real image type objective optical system, light combined by said beam combining element entering said objective optical system, a real image of said object being formed by said objective optical system on an image plane;

an eyepiece system for observing said real image formed by said objective optical system, and a distance-related information input system which obtains information corresponding to a distance to said object, and a controller which controls said deflecting system, in accordance with said information corresponding to a distance to said object;

wherein said real image includes a dual image composed of two superimposed images respectively corresponding to light entering through said first window and said second window, wherein said deflecting system is capable of changing a degree of relative displacement between said two superimposed images;

wherein said controller controls said deflecting system to change a deflecting condition so that said two superimposed images coincide with each other; and wherein said distance-related information input system comprises a distance measuring device which independently detects a distance to said object.

9. The finder system according to claim 8, wherein said deflecting system comprises a rotatable mirror rotatable about an axis which is perpendicular to said base length direction.

10. The finder system according to claim 9, wherein said deflecting system comprises a driving mechanism which drives said rotatable mirror.

11. The finder system according to claim 10, wherein said driving mechanism drives said rotatable mirror in response to movement of a focusing lens of said camera.

12. The finder system according to claim 8, further comprising a dual image area defining system which defines an area of said dual image within a finder field.

13. The finder system according to claim 12, wherein said dual image area defining system comprises an aperture plate located between said second window and said beam combining element.

14. The finder system according to claim 12, wherein said dual image area defining system comprises a mirror surface between said second window and said beam combining element, said mirror surface reflects a predetermined part of light entering through said second window corresponding to an area of said dual image.

15. The finder system according to claim 12, wherein said deflecting system comprises a rotatable mirror rotatable about an axis which is perpendicular to said base length direction, and wherein said dual image area defining system comprises a reflection surface of said rotatable mirror, said reflection surface reflects a predetermined part, corresponding to an area of said dual image, of light entered through said second window.

16. The finder system according to claim 8, wherein said beam combining element comprises a transparent plate having a half mirror portion, light entering through said finder window passing through said transparent plate, and light deflected by said deflecting system being incident on said half mirror portion.

17. The finder system according to claim 8, wherein said objective optical system is a variable-magnification optical system.

18. The finder system according to claim 17, wherein said objective optical system comprises a plurality of lens groups, magnification of said objective optical system being changeable by changing positional relationship said plurality of lens groups.

* * * * *